April 26, 1938.  J. B. ARMITAGE  2,115,058
MILLING MACHINE
Filed July 28, 1934
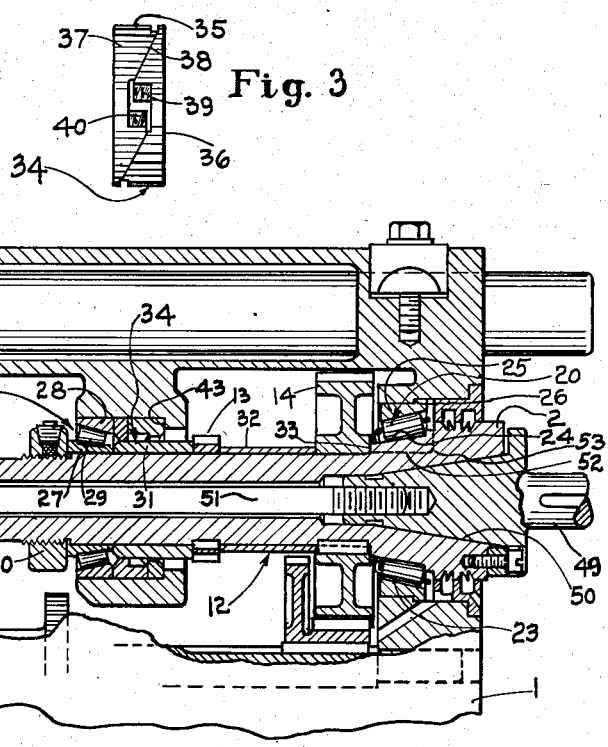
Fig. 1
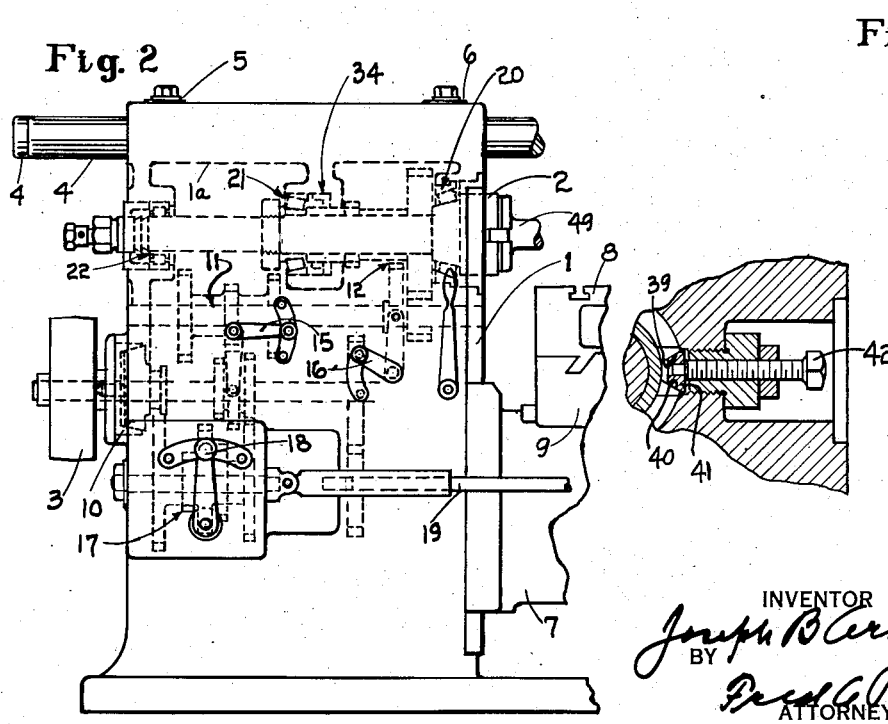
INVENTOR
Joseph B Armitage
BY
Fred C Parsons
ATTORNEY Patented Apr. 26, 1938

2,115,058

UNITED STATES PATENT OFFICE 2,115,058

MILLING MACHINE

Joseph B. Armitage, Wauwatosa, Wis., assignor to Kearney & Trecker Corporation, West Allis, Wis.

Application July 28, 1934, Serial No. 737,339

10 Claims. (Cl. 90—11)

This invention relates to milling machines and more particularly to the tool spindle and the support and drive train therefor.

An object of the invention is to provide means for journaling and driving the spindle of such a machine in a manner resulting in increased efficiency and rigidity of power transmission therethrough.

Another object of this invention is to support and drive the spindle of a milling machine in a manner that the strength and rigidity of the cutter support is substantially increased, particularly for face milling cutters.

Still another object is to provide anti-friction bearings, particularly at the head or cutter end of the spindle with a minimum number of parts and joints, and for a maximum spindle strength, a minimum of spindle overhang and a minimum of bearing diameter, and still other objects and advantages will be apparent from the drawing, description and claims.

The same reference characters refer to the same parts throughout the specification and drawing in which:

Figure 1 is a partial vertical section of the upper portion of a milling machine incorporating the invention, taken along the spindle axis.

Fig. 2 shows a partial side elevation of the milling machine, in reduced scale.

Figs. 3 and 4 are detail views of means for adjusting the spindle thrust bearings.

The machine shown in Fig. 2 is generally similar with respect to the spindle and table gearing to that shown in a Patent No. 1,818,089, issued August 11, 1931, and will, therefore, be only generally described as to those matters.

The milling machine includes a column or housing 1, a tool spindle or tool support 2 rotatably supported from column 1, and a drive pulley 3 constituting a power source for the machine. Overarms 4—4 may be provided supported from column 1 and adjustably fixed therewith by means of clamping members 5 and 6, and a knee or support 7 is slidably guided for vertical adjustment on column 1. Knee 7 supports a work table or work support 8 for reciprocation in a path at right angles to the axis of spindle 2 by means of a saddle or support 9 horizontally adjustable on knee 7 in a direction parallel to the axis of spindle 2.

The opposite ends of spindle 2 are exposed outside the column and the intermediate portions are enclosed within a box-like housing provided by the walls of the column and forming an interior chamber, generally denoted by the numeral 1a.

Spindle 2 may be driven from pulley 3 through a clutch, generally denoted by numeral 10, a first rate changer, generally denoted by numeral 11, and a second rate changer generally denoted by numeral 12. Rate changer 12 includes a pair of gears 13 and 14 fixed on the spindle. The rate changes are effected by hand levers 15 and 16 connected by suitable mechanism for shifting the gears of the rate changers to various position combinations.

The table transmission also originates with pulley 3 and includes a rate changer generally denoted by the numeral 17 and providing gearing shifted into various position combinations by a hand lever 18. A joint shaft 19 connects the rate changer with portions of the transmission which are supported by the knee, but these portions being identical with those shown in the patent previously referred to are not here shown.

The front end of spindle 2, that is to say, the end adjacent the table of the machine, is restrained against both lateral movement and rearward axial movement by an anti-friction bearing generally denoted by numeral 20. An intermediate anti-friction bearing generally denoted by numeral 21 restrains spindle 2 against lateral movement and forward axial movement. A rear anti-friction bearing, generally denoted by numeral 22, restrains the rear end of the spindle against any lateral movement.

Front bearing 20 includes tapered or cone shaped rollers 23 running on a conical surface or race 24 formed integral with spindle 2 and positioned at a point as closely adjacent to the front or cutter end of the spindle as may be possible. An outer annular ring 25 provides an outer race fixed in column 1 against a thrust shoulder 26. The arrangement is such that rearward axial movement of the spindle takes up any slack between the annular bearing surfaces and the rollers, and such axial movement is eventually arrested by thrusts against the rigid column. The intermediate bearing 21 includes an inner race or cone 27, an outer race or cone 28 and a plurality of conically shaped rollers 29. The inner race 27 is mounted on the spindle 2 and fixed in position relative thereto by a nut 30 which clamps the race together with a sleeve 31, gear 13, a sleeve 32 and gear 14 together against a shouldered portion 33 of the spindle. The outer race 28 is movable relative to column 1 and when moved rearwardly first takes up any slack in both the front bearing 20 and intermediate bearing 21 and then urges the spindle bodily rearwardly until it is restrained by the thrust of the front bearing against the solid column. For rearward movement of the outer race there is provided a device generally denoted by the numeral 34, Fig. 1, and shown in detail in Figs. 3 and 4. It consists of two annular members 35 and 36 having a plurality of complementary abutting cam surfaces such as 37, 38. Other cam surfaces 39, 40 are acted upon by a wedge 41 which may be forced inwardly by a screw 42 whereby to rotate the one annular member relative to the other and by reason of the surfaces 37, 38 also moves the one axially relative to the other. The one annular member is seated against a shoulder 43 of the column and the other against the outer race 28 and rotation of screw 42 moves the race rearwardly to adjust the front and intermediate bearings and move spindle 2 rearwardly as previously explained.

Rear bearing 22 includes a plurality of cylindrical rollers 44 running on an inner race 45 which is formed integrally with spindle 2 and an outer race 46, the outer race being clamped between a shoulder 47 on the column and a bearing cap 48.

In many of the uses of a milling machine the cutters are mounted on a cutter arbor socketed in the front end of the spindle as shown for the arbor 49, a portion of which is shown in Fig. 1. The socket required for such arbors is ordinarily in the form of a tapered axial bore such as 50 which extends a considerable distance into the spindle to provide sufficient length of arbor bearing to accurately align the arbor and spindle, and is of relatively large diameter, even at its smaller end, in order to provide for a sufficiently strong threaded arbor holding device such as the draw in rod 51. It is partly for these reasons that the front bearing 20 has its inner race formed integrally with spindle 2. If an inner, separate race were used, such as indicated by dotted lines at 52, the spindle would be unavoidably weakened at the point indicated by the numeral 53, or else it would be necessary to move the bearing 20 farther to the rear, whereby increasing the overhang of the front end of the spindle, which would be extremely objectionable, particularly in the loss of rigidity resulting therefrom.

What is claimed is:

1. In a milling machine, the combination of a hollow column having front and rear walls, a horizontal tool spindle rotatably supported from said column and having front and rear ends exposed outside of said front and rear walls respectively, said spindle providing a rearwardly tapered conical bore at the front end thereof for socketing an arbor and a draw-rod bore extending from said socket bore axially through said spindle, bearings for said spindle including a front spindle bearing associated with said front wall, a rear spindle bearing associated with said rear wall, and an intermediate spindle bearing between said front and rear walls, said front bearing being of anti-friction type and adapted to restrain said spindle against axial movement in one direction and against lateral movement and having an inner race formed integrally with said spindle at a point outside a tapered portion of said arbor socket bore, a transmission for driving said spindle including a rate changer, and a gear within said hollow column and driven through said rate changer and supported on said spindle at a point between said front and intermediate bearings and adjacent said inner race.

2. In a milling machine, the combination of a spindle supporting structure, a horizontal tool spindle rotatably supported from said structure and having exposed ends, said spindle providing a tapered conical bore at the one end thereof for socketing an arbor and a bore extending from said socket bore axially through said spindle, bearings for said spindle including end bearings spaced apart and adjacent different of said spindle ends respectively, and an intermediate bearing between said end bearings one of said end bearings adjacent the socketed end of said spindle being of anti-friction type adapted to restrain said spindle against axial movement in one direction and against lateral displacement and having an inner race formed integrally with said spindle at a point outside a tapered portion of said arbor socket bore, and a transmission for driving said spindle including a rate changer, and a gear driven through said rate changer and supported on said spindle at a point between said anti-friction and intermediate bearings and adjacent said inner race.

3. In a milling machine, the combination of a hollow column having front and rear walls, a horizontal tool spindle rotatably supported from said column and having front and rear ends exposed outside of said front and rear walls respectively, said spindle providing a rearwardly tapered conical bore at the front end thereof for socketing an arbor and a draw-rod bore extending from said socket bore axially through said spindle, bearings for said spindle including a front spindle bearing associated with said front wall, and a rear spindle bearing associated with said rear wall, said front bearing being of anti-friction type adapted to restrain said spindle against axial movement in one direction and against lateral movement and comprising an inner race formed integrally with said spindle at a point outside a tapered portion of said arbor socket bore, an outer race mounted in said front wall, and anti-friction rollers arranged between said races, a transmission for driving said spindle including a rate changer, and a gear within said hollow column and driven through said rate changer and supported on said spindle at a point adjacent to said inner race.

4. In a milling machine, the combination of a column, a tool spindle rotatably supported by said column and having its front end exposed outside of said column, said spindle presenting a rearwardly tapered conical bore at said exposed front end thereof for socketing an arbor, bearings for said spindle in said column including a front spindle bearing of anti-friction type adapted to restrain said spindle against axial movement in one direction and against lateral movement, said front bearing comprising an inner race formed integrally with said spindle at a point outside a tapered portion of said arbor socket bore, an outer race carried by said column, and anti-friction rollers arranged between said races, and a transmission for driving said spindle operatively connected thereto.

5. A tool spindle for a machine tool, having an enlarged end portion provided with a tool-receiving socket presenting an internal frustoconical surface disposed coaxially thereof, and having an inner race for an anti-friction bearing formed integrally on said enlarged end portion exteriorly of said socket and constituting a coaxial frusto-conical surface, said coaxial frustoconical surfaces being disposed in nested relationship in manner to converge in the same direction and said integral bearing race being positioned as near to the end of said spindle and formed of as small external diameter as is compatible with adequate strength in said spindle end portion to transmit high torque when operating at low speed, whereby said spindle is adapted to be supported by an anti-friction bearing capable of operating at high speed.

6. In a machine tool, a rigid supporting structure for a rapidly rotating cutting tool, comprising a machine frame, a tool supporting spindle rotatably mounted in said frame in manner to present an exposed tool-receiving end, said spindle having formed in said tool-receiving end a coaxially disposed tool-receiving socket presenting a frusto-conical internal surface, an inner anti-friction bearing race formed integrally with said spindle exteriorly of said socket and presenting an external coaxial frusto-conical surface, said internal and external frusto-conical surfaces being disposed in nested relationship to cooperatively define therebetween a tapered shell portion of said spindle end of substantially uniform wall thickness and of minimum external diameter compatible with adequate strength for transmitting high torque at low speed; an outer race complementary to said inner race and mounted in said frame, anti-friction rollers disposed between said complementary bearing races to constitute therewith a tapered roller bearing of minimum diameter adapted to operate at high speed and positioned to directly support the tool-receiving end of said spindle in the region radially outward from said tool-receiving socket, another tapered roller anti-friction bearing disposed opposite to said spindle end supporting bearing and operative to support said spindle at a position inwardly from said end, and means to tighten said bearings each in axial opposition to the other in manner to effect rigid support of said rotatable spindle, whereby a cutting tool may be rigidly supported while being rapidly rotated.

7. In a machine tool, a rigid supporting structure for a rapidly rotating cutting tool, comprising a machine frame, a tool supporting spindle rotatably mounted in said frame in manner to present an exposed tool-receiving end, said spindle having formed in said tool-receiving end a coaxially disposed tool-receiving socket presenting a frusto-conical internal surface, an inner anti-friction bearing race formed integrally with said spindle exteriorly of said socket and presenting an external coaxial frusto-conical surface, said internal and external frusto-conical surfaces being disposed in nested relationship to cooperatively define therebetween a tapered shell portion of said spindle end of substantially uniform wall thickness and of minimum external diameter compatible with adequate strength for transmitting high torque at low speed; an outer race complementary to said inner race and mounted in said frame, anti-friction rollers disposed between said complementary bearing races to constitute therewith a tapered roller bearing of minimum diameter adapted to operate at high speed and positioned to directly support the tool-receiving end of said spindle in the region radially outward from said tool-receiving socket, another tapered roller bearing mounted in said frame in position to support said spindle at a point inwardly from said tool-receiving end and disposed with its direction of taper opposite to that of said first bearing, and a pair of annular members having complementary abutting cam surfaces associated with said second bearing in such manner that when said annular members are turned relatively in one direction said cam surfaces function to cause relative axial movement of said annular members in direction to exert force on said second bearing in opposition to said first bearing, thereby tightening said bearings each against the other to effect rigid support of said rotatably mounted spindle.

8. In a milling machine having a hollow column including a rear wall and a front wall providing a spindle mounting, a relatively large tool supporting spindle rotatably mounted in said column for high speed operation and presenting an exposed tool-receiving socket in an end projecting through said front wall of the column, bearings for journaling said spindle in said column including a front anti-friction spindle bearing, said front bearing comprising an outer tapered bearing race arranged in said front wall of the column, a complementary inner tapered bearing race arranged on and formed integrally with said spindle adjacent to the tool-receiving end thereof and radially outward from said socket, said inner race being disposed in cooperating relationship with said outer race in said column, tapered and anti-friction bearing rollers arranged in operative relationship between said outer race and said inner race in manner to rigidly support said spindle end, said anti-friction bearing structure being of minimum diameter comparable with the size of said spindle to permit high speed operation of said spindle, and power transmission mechanism mounted in said hollow column and operatively connected to said large spindle for rotating it at high speed.

9. In a milling machine having a column providing a spindle mounting, a relatively large tool supporting spindle rotatably carried by said column and presenting a socketed projecting tool-receiving end, driving means for said spindle including speed changing mechanism operatively connected to said spindle for driving it selectively at high speed with low torque or at low speed with high torque, bearings for journaling said spindle including a front anti-friction spindle bearing and a rear anti-friction spindle bearing, said front bearing comprising an inner bearing race arranged on and formed integrally with said spindle and disposed adjacent to the tool receiving end thereof to constitute means for rigidly supporting said spindle end, said race being of minimum external diameter compatible with adequate strength of said spindle end for transmitting high driving torque to a tool when operating at low speed, a complementary outer race supported by said column in cooperating relationship with said inner race, and anti-friction bearing rollers arranged between said races in manner to constitute therewith an anti-friction bearing structure of minimum diameter adapted to permit operation of said large spindle at high speed.

10. In a milling machine, a rigid supporting structure for a rapidly rotatable cutting tool of relatively large size and cutting capacity, comprising a column providing a spindle mounting, a relatively large tool supporting spindle rotatably mounted in said column in manner to present a protruding tool-receiving end, an anti-friction bearing disposed to rotatably support the inner end of said spindle within said column, driving means for said spindle including speed changing mechanism operative to drive said spindle selectively either at high speed and relatively low torque or at low speed and relatively high torque, said spindle having formed in its tool-receiving end a large co-axially disposed tapered tool-receiving socket presenting a frusto-conical internal surface, an inner tapered anti-friction bearing race arranged on and formed integrally with said spindle adjacent to the tool-receiving end thereof and exteriorly of said socket, said race presenting an external frusto-conical surface disposed in nested relationship with said internal frusto-conical surface and defining therewith a wall of substantially uniform thickness constituting a tapered hollow spindle end shell of minimum external diameter compatible with adequate strength to transmit the high torque exerted when a cutting tool is being driven at low speed, a complementary outer tapered anti-friction bearing race rigidly supported in said column in cooperating relationship with said integral inner race, and tapered anti-friction bearing rollers disposed between said complementary bearing races to constitute therewith a tapered anti-friction roller bearing positioned to afford rigid and direct support for said spindle end in the region radially outward from said tool-receiving socket, said bearing being of minimum diameter and capable of turning at high speed, whereby said large spindle may be rotated rapidly to drive a cutting tool at high speed.

JOSEPH B. ARMITAGE.